US006854019B2

United States Patent
Egle

(10) Patent No.: US 6,854,019 B2
(45) Date of Patent: Feb. 8, 2005

(54) SYSTEM USES TIME PULSE THAT SIMULTANEOUSLY TRANSMITS WITH TIME OF DAY MESSAGE TO SYNCHRONIZE NETWORK USER STATIONS

(75) Inventor: Fridolin Egle, Durmersheim (DE)

(73) Assignee: Siemens Aktiengesellschaft, Munich (DE)

( * ) Notice: Subject to any disclaimer, the term of this patent is extended or adjusted under 35 U.S.C. 154(b) by 809 days.

(21) Appl. No.: 09/853,607

(22) Filed: May 14, 2001

(65) Prior Publication Data

US 2002/0000919 A1 Jan. 3, 2002

Related U.S. Application Data

(63) Continuation of application No. PCT/DE99/03509, filed on Nov. 3, 1999.

(30) Foreign Application Priority Data

Nov. 13, 1998 (DE) .................................. 298 20 339 U

(51) Int. Cl.[7] .............................................. G06F 15/16
(52) U.S. Cl. ..................................... 709/248; 713/400
(58) Field of Search .......................... 709/248; 713/400, 713/500; 318/85; 345/708; 711/151; 455/436; 375/354

(56) References Cited

U.S. PATENT DOCUMENTS

| | | | | |
|---|---|---|---|---|
| 5,276,659 A | | 1/1994 | Kotaki ......................... 368/10 |
| 5,580,366 A | | 12/1996 | Farkas et al. ................. 65/158 |
| 5,701,446 A | * | 12/1997 | Abali et al. .................. 713/400 |
| 5,784,421 A | * | 7/1998 | Dolev et al. ................. 375/354 |
| 5,990,638 A | * | 11/1999 | Aoyama et al. .............. 318/85 |
| 6,138,019 A | * | 10/2000 | Trompower et al. ........ 455/436 |
| 6,182,197 B1 | * | 1/2001 | Dias et al. ................... 711/151 |
| 6,209,106 B1 | * | 3/2001 | Kubala et al. ............... 713/500 |
| 6,587,122 B1 | * | 7/2003 | King ........................... 345/708 |
| 6,725,278 B1 | * | 4/2004 | Gonzalez ..................... 709/248 |

FOREIGN PATENT DOCUMENTS

| | | | |
|---|---|---|---|
| DE | 36 38 947 | 5/1988 | .......... G06F/15/16 |
| DE | 43 20 137 | 12/1993 | .......... G04C/11/04 |
| DE | 198 08 103 | 9/1999 | .......... H04L/12/42 |
| DE | 298 19 806 | 4/2000 | .......... H04L/12/403 |
| WO | 96/27822 | 9/1996 | .......... G04G/7/02 |

* cited by examiner

Primary Examiner—Le Hien Luu
(74) Attorney, Agent, or Firm—Sughrue Mion, PLLC

(57) ABSTRACT

A network user system and a method of using the same in which one network user station (2c) is connected with another network user station (2a) via a message line (9a) and to which, in a receive mode, the other network user station (2a) can transmit a time message (Un, 5) comprising a time of day. The network user station (2a) also simultaneously transmits along with the time message a plurality of time pulses to the other network user stations (2b, 2d, 2e...) in the system. The network user stations (2a, 2b, 2c, ...) record the time difference between the instant when the time pulses Tp are received and the instant when the time message (5) is received, and thereupon adjust the time of day contained in the time message (5) based on the time difference. This ensures that the time of day that is further processed in the receiver (4a, 4b, 4c...) is the correct time at the instant of processing and, further, that the clock (6) of the network user station (2a) and the clock (8) of the other network user station (2c) are substantially synchronized. To measure the time difference in a simple manner, a timer is provided, which is started by the time pulse (Tp) and stopped by the time message (5).

10 Claims, 2 Drawing Sheets

SYSTEM USES TIME PULSE THAT SIMULTANEOUSLY TRANSMITS WITH TIME OF DAY MESSAGE TO SYNCHRONIZE NETWORK USER STATIONS

This is a Continuation of International Application PCT/DE99/03509 with an international filing date of Nov. 3, 1999, which was published in German and the full disclosure of which is incorporated into this application by reference.

FIELD OF AND BACKGROUND OF THE INVENTION

The invention relates to a network user system and method of using the same, which can be used to connect one network user station to another network user station via a message line and to which, in a receive mode, a timer message including a time of day can be sent by a network user station as a means of improving time synchronization accuracy between network user stations.

Such a network user station is known from the Siemens catalog ST 70, chapter 12, 1997 edition. This network user station is suitable for use in a distributed automation system including a plurality of automation components, which must be synchronized for controlling a technical process in accordance with an automation task. To this end, a time transmitter connected to the network cyclically transmits a timer message via broadcasting or multicasting. The automation components use this transmitted timer message to synchronize their clocks. Due to different dwell times of a timer message in the transmitter of the network user station and/or in network components, the times contained in the timer message may be incorrect at the time when they are received.

German Utility Model Application 298 19 806.1 proposes to enable a network user station to correct the delay times between the instant when the time is entered into a time message and the instant when it is transmitted, and to correct the delay times between the instant when the time message is received and the instant when the time of day is further processed. This German Utility Model Application 29819806.1 corresponds to International Application PCT/DE99/03443 (published as WO 00/28400), which was filed in the United States as a Continuation Application (application number unknown) on May 7, 2001, and full disclosure of which is incorporated herein by reference.

OBJECTS AND SUMMARY OF THE INVENTION

Thus, one object of the present invention is to create a network user system of the type mentioned above with improved time synchronization accuracy as well as a method of synchronizing network user stations.

This and other objects are achieved by utilizing a network user system that can be used to connect one network user station to other network user stations via a synchronization line through which a network user can transmit time pulses to other network user stations. The network user station also simultaneously transmits along with the time pulses a time message to other network user stations in the system. The network user stations record the time difference between the instant when the time pulses are received and the instant when the time message is received, and thereupon adjust the time of day contained in the time message based on the time difference.

This ensures that the time of day that is further processed in the receiver is the correct time at the instant of processing and, further, that the clock of the network user station and the clock of the other network user station are substantially synchronized.

To measure the time difference in a simple manner, a timer is provided, which is started by the time pulse and stopped by the time message.

BRIEF DESCRIPTION OF THE DRAWINGS

The invention and further advantageous refinements of the invention according to the features of the dependent claims are explained in more detail below with the aid of diagrammatic, exemplary embodiments in the drawing, in which:

DETAILED DESCRIPTION OF THE PREFERRED EMBODIMENTS

Figure 1:
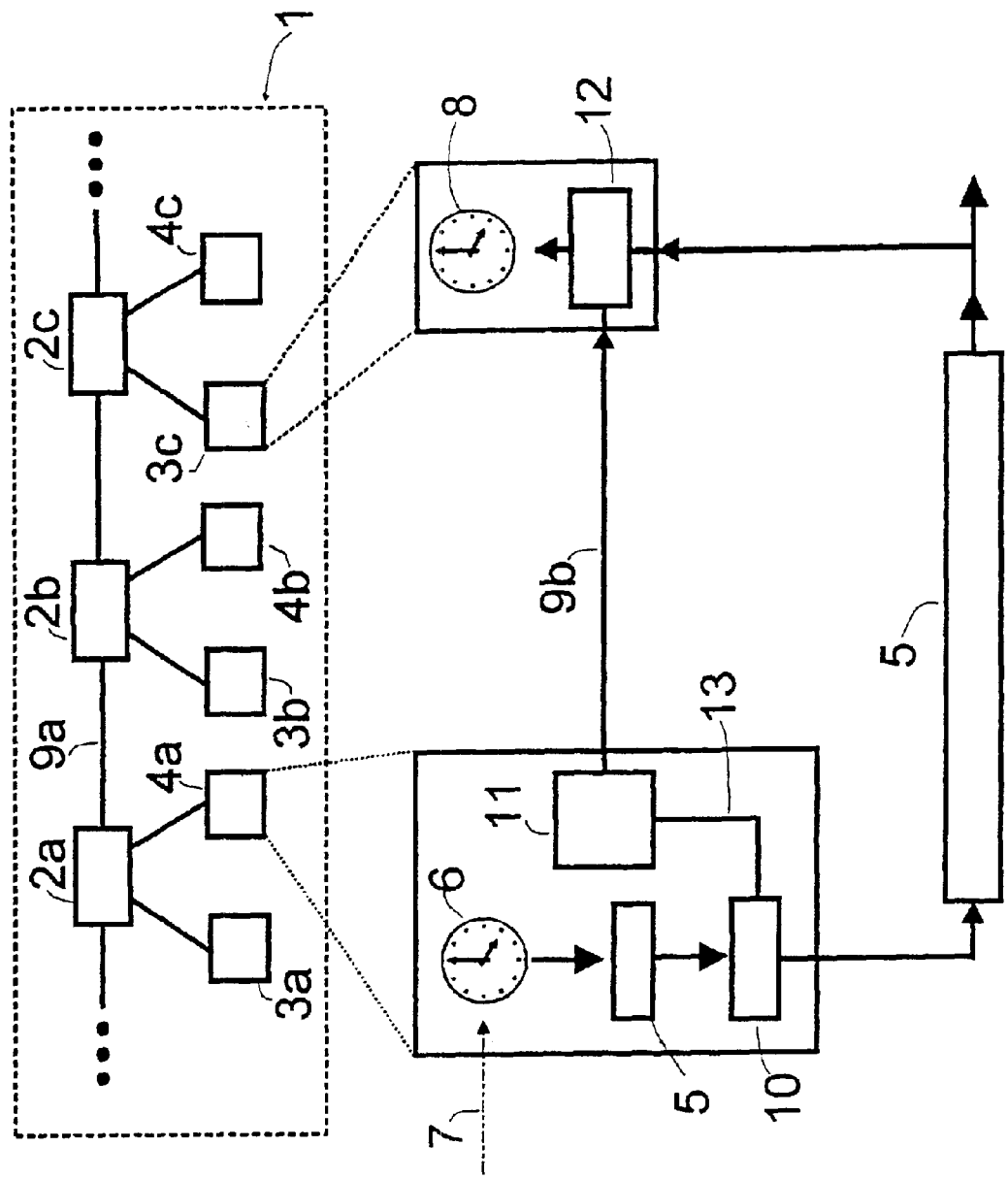
FIG. 1 is a schematic diagram of a network.

In FIG. 1, a network 1 is illustrated, e.g., a local area network (LAN). A plurality of network user stations 2a, 2b, 2c, . . . are connected to the network 1 via a message line 9a. Each of the network user stations have a receiver 3a, 3b, 3c, . . . and a transmitter 4a, 4b, 4c. In this embodiment of the present invention, it is assumed that the transmitter 4a of network user station 2a transmits a message 5 to the receiver 3c of network user station 2c. The time message contains the time of day of a clock 6 of network user station 2a, which is preferably externally synchronized by a signal 7. A clock 8 of network user station 2c must be synchronized with the time of day entered in the time message at an input instant. Also, in this embodiment of the present invention, it is assumed that the time difference between the instant when the time of day is entered in the time message 5 and the instant when the time message 5 is transmitted is negligible, or that suitable means, such as those described in German Utility Model Application 298 19 806.1, are used to correct this time difference.

To prevent incorrect synchronization of the clock 8 of the network user station 2c with the time of another network user station 2a, the deviations caused by line delays must be substantially compensated. To this end, a synchronization line 9b is provided for transmitting time pulses Tp to the receiver 3c of network the user station 2c. At the instant when the time message 5 is transmitted, a network controller 10 or, as shown in the present example, a time pulse transmission unit 11 of a recording and adjusting unit 12 of the receiver 3c, simultaneously transmits a time pulse, e.g., a time pulse in the form of a second pulse. The controller 10 of the time pulse transmission unit 11 indicates the instant when the time message 5 is transmitted via a line 13. The time pulse starts a timer of the recording and adjusting unit 12, which is stopped when unit 12 receives the time message 5. This allows the receiving network user station 2c to determine the time difference between the instant when the time pulse Tp is received and the instant when time message 5 is received. The recording and adjusting unit 12 thereupon adjusts the time of day contained in time message 5 in that unit 12 adds the determined time difference to the stored time of day so that the times of transmitter 4a and receiver 3c are substantially synchronized.

Figure 2:
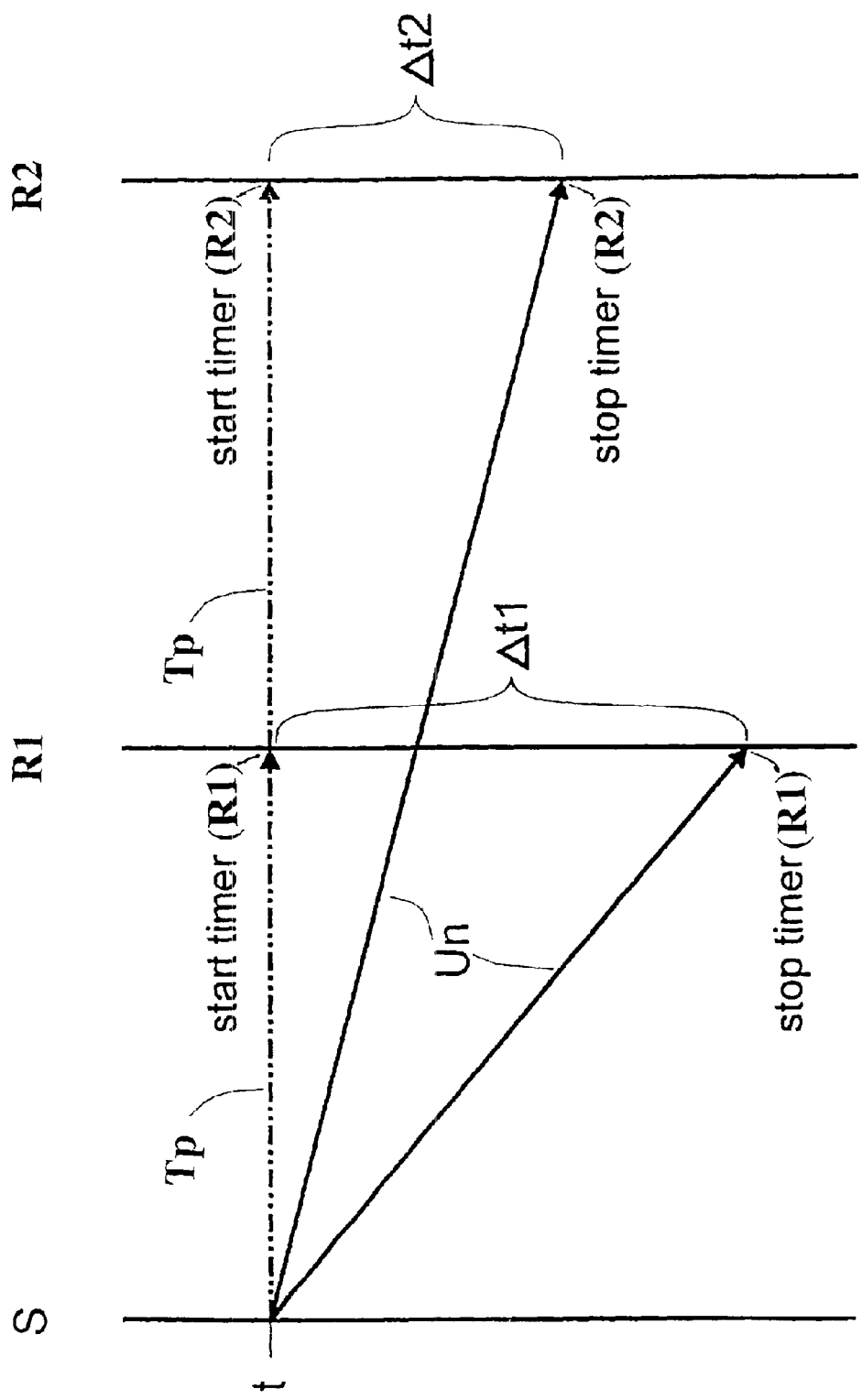
FIG. 2 is a time diagram of transmission signals.

To illustrate the time adjustment, reference is made to FIG. 2, which depicts a time diagram of transmission signals.

At an instant t a transmitter T (e.g., 4a in FIG. 1) of a network user station transmits a time pulse Tp and simultaneously a time message Un to receivers R1, R2 of other network users. The time pulse Tp starts corresponding timers in receivers R1, R2, which are stopped at the instant when time message Un is received. In the example depicted, time message Un is delayed less during its transmission to receiver R1 ($\Delta t1$) than during its transmission to receiver R2 ($\Delta t2$). A recording and adjusting unit 12 in receiver R1 adjusts the time of day contained in the time message by a time difference $\Delta t1$ and in receiver R2 by a time difference $\Delta t2$.

What is claimed:

1. A synchronized network user station system, comprising:
   - a first network user station;
   - a second network user station;
   - a message line connecting said first network user station and said second network user station for sending a time message containing a time of day from said first network user station to said second network user station;
   - a synchronization line also connecting said first and said second network user stations for transmitting a time pulse from said first network user station to said second network user station, wherein said first network user station simultaneously transmits said time pulse and said time message to said second network user station; and
   - a recording and adjusting means that records a time difference between an instant when said time pulse is received and an instant when said time message is received by said second network user station and adjusts the time of day contained in said time message according to said time difference.

2. The synchronized network user station system as claimed in claim 1, wherein said second network user station has a timer 5 for recording the time difference, which is started by said time pulse and stopped by said time message.

3. The synchronized network user station system as claimed in claim 2, wherein said first network user station simultaneously transmits to said second network user station said time message containing a time of day via said message line and said time pulse via said synchronization line.

4. The synchronized network user station system according to claim 1, wherein said time message and said plurality of time pulses are transmitted by a transmitter contained in said first network user station.

5. The synchronized network user station system according to claim 1, wherein said time message and said plurality of time pulses is received by said receiver contained in said second network user station.

6. A synchronized network user system for connecting a plurality of network users comprising:
   - a plurality of network user stations;
   - a message line connecting said plurality of network user stations and for transmitting a time message containing a time of day between said plurality of network user;
   - a synchronization line also connecting said plurality of network user stations and for transmitting a time pulse between said plurality of network user stations, wherein said time pulse and said time message are simultaneously transmitted; and
   - a recording and adjusting unit contained in at least one of said plurality of network user stations that records a time difference between an instant when time pulse is received and an instant when said time message is received by said at least one of said plurality of network user stations and adjusts the time of day contained in said transmitted time message according to said time difference.

7. The network user system according to claim 6, wherein said time message and said time pulse are transmitted by a transmitter contained in at least one of said plurality of network user stations.

8. The network user system according to claim 6, wherein said time message and said time pulse is received by said receiver contained in at least one of said plurality of network user.

9. A method of synchronizing a first network user station with a second network user station connected in a network comprising:
   - connecting said first and said second network user station using a message line, and via said message line transmitting a time message from said first network user station to said second network user station;
   - connecting said first network user station and said second network user station using a synchronization line, and via said synchronization line, transmitting a time pulse from said first network user station to said second network user station;
   - recording a time difference between an instant when said time message is received by said second network user station and an instant when said time pulse is received by said second network user station; and
   - adjusting a time contained in said second network user station according said time difference.

10. The method according to claim 9, wherein said time message transmitted by said first network user station contains a time of day read from a clock in said first network user station.

* * * * *